Nov. 10, 1942.  A. G. BISHOP  2,301,244
RIVET
Filed Jan. 28, 1942
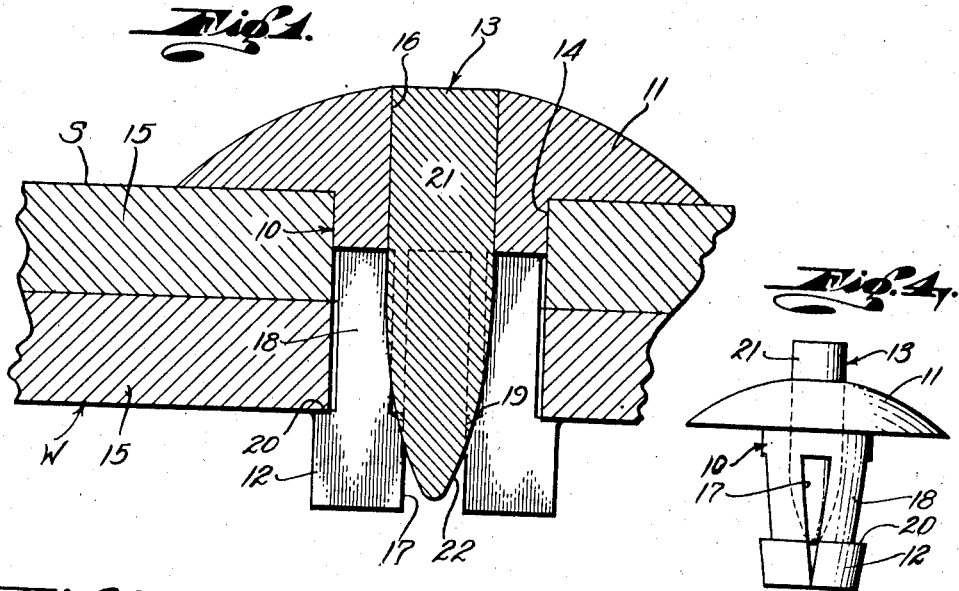
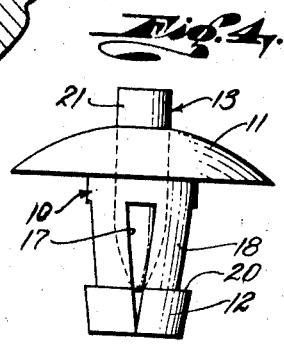
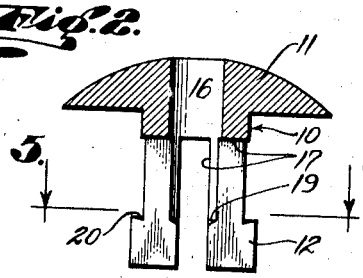
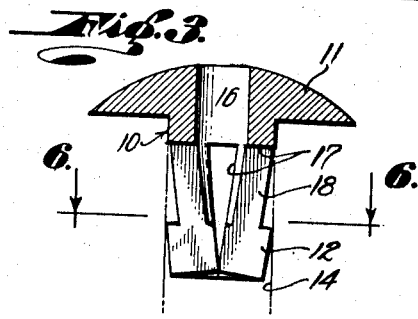
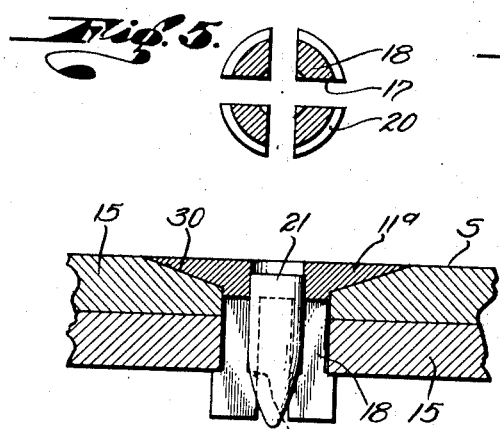
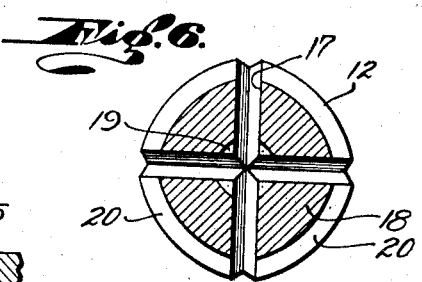
Inventor
ARCHIE G. BISHOP
Attorney Patented Nov. 10, 1942

2,301,244

UNITED STATES PATENT OFFICE 2,301,244

RIVET

Archie G. Bishop, San Gabriel, Calif.

Application January 28, 1942, Serial No. 428,553

5 Claims. (Cl. 85—40)

This invention relates to connecting and securing means and has particular reference to rivets. A general object of this invention is to provide a practical and highly effective rivet.

In the employment of ordinary rivets it is necessary to back up the rivets, two men being required to install each rivet, one man driving the rivet and the other backing it up. In many devices and constructions it is impractical or impossible to gain access to the inner ends of the rivets for the purpose of backing them up. For example, in aircraft construction there are many places where the inner ends of the rivets are inaccessible. In such cases expansion rivets are employed. One type of expansion rivet carries a charge of explosive which is ignited by heat to cause expansion of the inner portion or head of the rivet. Mechanically expansible rivets have been proposed but, so far as I am aware, have never proved satisfactory.

The expansible rivets of both the explosive type and mechanical type have certain disadvantages and insufficiencies. The inner portions of the prior expansible rivets expand laterally, that is, radially with respect to the longitudinal axes of the rivet bodies and while their inner heads are expanded to overlie the surface of the plate or work they exert little, if any, pressure in a longitudinal direction and, therefore, do not clamp the sheets or plates together in tight engagement.

Another disadvantage or insufficiency of the prior expansible rivets is the inability to further expand the rivets following their initial installation. In many situations and particularly in aircraft construction it is important that the rivets be tightened up after a certain period of service. So far as I am now aware it is impossible to tighten the prior expansible rivets after they have been installed and initially expanded.

Another object of this invention is to provide an expansible rivet or self heading rivet that may be easily and quickly installed by one operator and that does not require backing up. The rivets of the invention are well adapted for use in situations where it is difficult or impossible to back up the rivets from their inner ends and are useful in all other situations where rivets are employed and where it is desired to speed up the construction and reduce the labor requirements.

Another object of this invention is to provide a rivet of the character referred to whose expansible head or inner head clamps against the work with great force in a direction axially of the rivet so that the riveted together sheets or other work parts are tightly pressed one against the other. The rivet of the present invention has an inner head which is forced outwardly or toward the outer rivet head when it is expanded radially and this longitudinal or axial expansion of the inner head causes the plates or sheets to be tightly clamped and held.

Another object of the invention is to provide an expansible rivet of the character referred to that may be tightened as required after it has been in service. The inner head or expanded portion of the improved rivet may be further expanded after the aircraft or other structure has been in use, to take up any play or looseness that may have developed.

Another object of this invention is to provide a rivet of the character mentioned that is simple and inexpensive in construction and that may be installed by simple tools in a single operation.

The various objects and features of my invention will be fully understood from the following detailed description of typical preferred forms and applications of my invention, throughout which description reference is made to the accompanying drawing, in which:

Fig. 1 is a longitudinal detailed sectional view of one form of improved rivet of the invention in position on the work after being expanded or headed up. Fig. 2 is a reduced longitudinal detailed sectional view of the rivet body before the arms have been retracted. Fig. 3 is a view similar to Fig. 2 showing the arms retracted so that the rivet body is in condition for use. Fig. 4 is a side elevation of the rivet in condition for shipping. Fig. 5 is a transverse detailed sectional view taken as indicated by line 5—5 on Fig. 2. Fig. 6 is an enlarged transverse detailed sectional view taken as indicated by line 6—6 on Fig. 3 and Fig. 7 is a longitudinal detailed sectional view of another form of the invention with the inner rivet head expanded and tightened up after service.

The present invention may be incorporated in rivets of various forms and types for use in different situations. The relative proportions of the parts may be different with different sizes and types of rivets. In the drawing I have shown two typical examples of rivets of the invention, it being understood that these are merely illustrative forms of the present construction.

The rivet of the present invention illustrated in Figs. 1 to 6, inclusive, may be said to comprise, generally, a rivet body 10 having an outer head 11, parts 12 adapted to form an inner head and means 13 for expanding the parts 12 so that they form an inner head for the rivet.

The body 10 of the rivet may take different forms and may be of different shapes depending upon the intended use of the rivet. In the case illustrated where the rivet is to be installed in registering openings 14 in a pair of plates or sheets 15 the body 10 is an elongate member proportioned to extend completely through the registering openings 14. The outer head 11 is preferably an integral part of the body 10 and, in the form of the invention being described, is designed to flatly bear against the exposed surface S of the outer sheet 15. In this form of construction the outer rivet head 11 has a rounded or convex outer surface, it being understood that the head may be of different shapes.

In accordance with the invention a longitudinal opening 16 enters the rivet body 10 from the outer end of the head 11 and extends for a substantial distance through the body. As initially formed, the opening 16 may be a simple cylindrical bore and the opening terminates some distance from the inner end of the rivet. The body 10 is further provided with circumferentially spaced longitudinally extending slots 17 which enter the body from its inner end. The slots 17 preferably terminate below or inwardly of the head 11 leaving the body 10 with an imperforate or unslotted portion which is adapted to extend into the opening 14 of the outer plate 15 for some distance. In some cases the slots 17 may extend to the head 11. The slots 17 are preferably all alike and there may be any required number of slots. In the drawing there are four equally spaced slots 17. As initially formed the slots 17 may have flat parallel side walls and may be in the nature of saw cuts although they may be formed in any other selected manner.

The spaced slots 17 define or leave a series of spaced longitudinally extending arms 18. It will be observed that these arms 18 are of substantial length extending from a plane a short distance inwardly of the head 11 to the inner extremity of the rivet. The slots 17 which provide or define the arms 18 are radial and their medial longitudinal planes intersect at the longitudinal axis of the rivet body. As best shown in Figs. 1, 2 and 4 of the drawing the width of the slots 17 is less than the diameter of the opening 16. This leaves or provides for internal outwardly facing shoulders 19 on the inner sides of the arms 18 where the opening 16 terminates and joins the cavity or central space created in the rivet where the slots 17 join. The shoulders 19 lie in a common plane and may be bevelled or pitched as shown. It is usually preferred to locate the shoulders 19 so that they are in or adjacent the plane of the exposed surface S of the inner sheet 15 assuming the rivet to be in position in the opening 14.

The parts 12 which form the inner head of the rivet are what may be termed enlargements or projections on the inner portions of the arms 18. The parts 12 project laterally or radially from the arms 18 to present shoulders 20 which face or oppose the flat under side of the head 11. The width of the shoulders 20 is equal to or slightly less than the width of the slots 17. It may be preferred to slightly under cut the shoulders 20, that is, to pitch the shoulders downwardly and inwardly toward the longitudinal axis of the rivet body 10 to have more effective cooperation with the work W, as will more fully appear. The parts 12 are preferably integral portions of the arms 18 and are of substantial length to give the inner rivet head strength and rigidity.

As will be seen from an inspection of Fig. 2 the parts 12 extend outwardly beyond the circumference of the rivet body 10. It is preferred to proportion the rivet body 10 to closely or rather accurately fit the openings 14 in the work and, accordingly, the series of parts 12 has an external diameter greater than the diameter of the openings 14. In order to provide for the ready insertion of the rivet in the openings 14 the arms 18 are made to converge downwardly and inwardly as shown in Fig. 3. The arms 18 converge downwardly and inwardly from their point of joinder with the unslotted body portion to their lower or inner extremities and their inner corners may contact or substantially contact as shown in Fig. 3. This convergence of the arms 18 brings the parts 12 within the circumference of the openings 14, it being observed that the shoulders 20 are equal to or slightly less than one-half the width of the slot 17 so that the inward convergence of the arms 18, as just described, brings the series of parts 12 to positions where their outer circumference is equal to or less than that of the openings 14. The arms 18 may be flexed or bent inwardly to their convergent positions following the forming of the opening 16 and slots 17 or the arms may be given their convergence during any selected phase of manufacture. It will be observed that where the arms 18 are inwardly and downwardly convergent as just described the inner or internal faces of the arms likewise converge. As the internal surfaces of the arms 18 are formed in part by the opening 16 it may be said that the inner portion of the opening 16 has inwardly convergent walls as presented by the arms 18. In the event only two arms 18 are provided it may be necessary to flatten, curve or otherwise shape the sides of the parts 12 adjacent the slots 17 to allow the rivet to be readily entered through openings 14.

The means for expanding or spreading the inner rivet head parts 12 constitutes a pin 21. The pin 21 is arranged in the body opening 16 and is adapted to be forced or driven inwardly to spread the arms 18 radially and thus swing the head parts 12 to positions where they press or clamp tightly against the exposed surface S of the inner sheet 15. The pin 21 may be initially force fitted or press fitted on the opening 16 to remain therein during shipping, etc., so that the rivet is complete and ready for use when supplied to the riveter. The pin 21 is proportioned so that when the rivet is supplied to the riveter the pin projects upwardly or beyond the head 11 and the inner end of the pin is seated against or is in engagement with the convergent inner surfaces of the arms 18. As clearly illustrated in Fig. 1 of the drawing the inner portion 22 of the pin 21 is tapered or pointed to some extent to have more even and effective engagement with the convergent inner faces of the arms 18.

In use, the rivet constructed and assembled as above described is inserted through the openings 14 so that the inner side of the head 11 flatly engages against the work surface S. With the head 11 firmly held against the work the pin 21 is driven or forced inwardly. In this connection it will be apparent how a suitable tool or tools may be employed to hold the rivet in place and to force the pin 21 inwardly. The pin 21 may be proportioned so that inward movement of the pin to a position where its outer end is flush with the surface of the head 11 indicates that the head parts 12 have been fully or properly expanded. When the pin 21 is forced or driven inwardly its convergent end portion 22 cooperates with the convergent inner faces of the arms 18 and causes the arms to flex or swing outwardly. The arms 18 swing or move outwardly or laterally about axes adjacent their points of connection with the unslotted portion of the body 10 and thus act as levers. The outward movement or swinging of the arms 18 brings the shoulders 20 of the head parts 12 into engagement with the exposed surface S of the inner sheet 15. The pendulum or lever-like swinging action of the arms 18 gives the parts 12 an arcuate movement so that the head parts 12 move axially and toward the outer head 11 as well as laterally. The compound movement or arcuate movement of the head parts 12 causes their shoulders 20 to press or clamp against the surface S of the inner sheet 15 in such a way that the sheets 15 are tightly clamped or gripped between the head 11 and the inner head parts 12. The expansion or outward swinging of the arms 18 may also bring the outer surface of the arms 18 into tight binding engagement with the walls of the openings 14. The unslotted portion of the body 10 immediately inward of the head 11 may be expanded to some extent to more tightly fit the opening 14 of the outer sheet 15. The body 10 may initially fit the openings 14 with a press or force fit engagement and the further expansion of the body insures a fluid tight seal. In a like manner the pin 21 accurately or closely fits the body opening 16 to provide a tight sealing engagement so that fluid and fluid pressure are excluded.

The above operation of expanding or heading up the rivet results from the engagement of the tapering portion 22 of the pin 21 with the convergent inner surfaces of the arms 18. After use or service of the apparatus in which the rivet is installed it may be desirable or necessary to tighten the rivet. The rivet may be readily tightened to take up any play or looseness that may have developed between the sheets 15. This is done by merely driving or forcing the pin 21 inwardly. This further inward movement of the pin 21 brings its tapering inner portion into engagement with the shoulders 19. The tapering part of the pin 21 acting against the shoulders 19 may further spread or expand the arms 18 to tighten the rivet and take up any play that may have developed. This further inward movement of the pin 21 may be accomplished by a simple tool or set.

Fig. 7 of the drawing illustrates a flush head type rivet of the invention. The rivet of Fig. 6 is the same as that described above except that its outer head 11a is shaped to occupy a counter bore in the outer sheet 15 and to have its outer end surface flush with the exposed surface S of the sheet. The other parts of the rivet may be the same as above described. Fig. 7 shows the arms 18 spread with the parts 12 in tight clamping engagement with the work and illustrates the pin 21 in the position it may assume after being employed to tighten the rivet after extended use or service of the machine or structure. It will be observed that the tapering lower portion of the tapering inner portion of the pin 21 acts on the shoulders 19 to further spread the arms 18 and to actuate the parts 12 into tight gripping cooperation with the work or sheet 15.

Having described typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A rivet for use in an opening in work comprising a rivet body having a head on its outer end for engaging against one side of the work, the body having a longitudinal opening entering it from its outer end and circumferentially spaced longitudinal slots entering it from its inner end and terminating short of said outer end, the portions of the body between the slots constituting longitudinally extending arms which converge toward the longitudinal axis of the rivet, laterally projecting parts on the outer sides of the arms, a member in the opening of the body adapted to act against the inner sides of the converging arms to spread the arms so that said parts are swung laterally and axially against the other side of the work, and means for tightening the rivet after use comprising shoulders on the inner sides of the arms engageable by said member.

2. A rivet to be installed in an opening in work comprising a body having a longitudinal opening entering it from the outer end, a head on the outer end of the body for engaging one side of the work, a series of longitudinally extending fingers on the inner portion of the body adapted to extend beyond the other side of the work, laterally projecting parts on the outer sides of the fingers, the surfaces of said parts which face toward the head being undercut, the fingers being inwardly convergent to bring said parts to positions where they may be passed through the opening in the work, and a member in the body opening engageable with the inner sides of the convergent fingers to swing the fingers laterally so that said surfaces of the projecting parts are made to tightly engage against the other side of the work.

3. A rivet to be installed in an opening in work comprising a body having a longitudinal opening entering it from the outer end, a head on the outer end of the body for engaging one side of the work, a series of longitudinally extending fingers on the inner portion of the body adapted to extend beyond the other side of the work, laterally projecting parts on the outer sides of the fingers, the fingers being inwardly convergent to bring said parts to positions where they may be passed through the opening in the work, a pin in the body opening projecting from the outer end of the body and adapted to be moved inwardly so that its cooperation with the converging fingers flexes the fingers laterally to bring said parts into engagement with the other side of the work, and means for tightening the rivet after it has been in service comprising shoulders on the inner sides of the fingers acted on upon further inward movement of the pin to further spread the fingers.

4. A rivet of the class described comprising a rivet body having a longitudinal opening, spaced arms on an end portion of the body presenting inwardly converging surfaces at their inner sides, projecting head parts on the outer sides of the arms, a pin in the opening adapted to cooperate with said surfaces to spread the arms so that the head parts are engaged with the work, and means for causing further expansion of the arms comprising shoulders on the inner sides of the arms engageable by the pin.

5. A rivet to be installed in an opening in work comprising a body having a longitudinal opening entering it from the outer end, a head on the outer end of the body for engaging one side of the work, a series of longitudinally extending fingers joining the body in a plane spaced between the opposite sides of the work and extending through the opening in the work to project beyond the other side of the work, external projections on those portions of the fingers which extend beyond said other side of the work, the internal surfaces of the fingers lying within the circumference of the opening in the body, a pin in the opening adapted to be forced against said internal surfaces of the fingers to swing the fingers laterally about axes at said plane so that the projections are made to clamp against said other side of the work and internal shoulders on the fingers engageable upon further movement of the pin to tighten said projections against the work.

ARCHIE G. BISHOP.